(12) United States Patent
Lang et al.

(10) Patent No.: US 12,000,488 B2
(45) Date of Patent: Jun. 4, 2024

(54) MECHANICAL SEAL WITH IMPROVED GROOVE ARRANGEMENT

(71) Applicant: EagleBurgmann Germany Gmbh & Co. KG, Wolfratshausen (DE)

(72) Inventors: Klaus Lang, Eurasburg (DE); Thomas Zauner, Pullach (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 32 days.

(21) Appl. No.: 17/911,754

(22) PCT Filed: Jan. 26, 2021

(86) PCT No.: PCT/EP2021/051691
§ 371 (c)(1),
(2) Date: Sep. 15, 2022

(87) PCT Pub. No.: WO2021/190802
PCT Pub. Date: Sep. 30, 2021

(65) Prior Publication Data
US 2023/0194000 A1    Jun. 22, 2023

(30) Foreign Application Priority Data
Mar. 24, 2020   (DE) ............ 10 2020 203 764.7

(51) Int. Cl.
*F16J 15/34*    (2006.01)

(52) U.S. Cl.
CPC .................. *F16J 15/3412* (2013.01)

(58) Field of Classification Search
CPC ........ F16J 158/00; F16J 158/16; F16J 158/50; F16J 158/52; F16J 158/34;
(Continued)

(56) References Cited

U.S. PATENT DOCUMENTS 3,957,276 A * 5/1976 Wiese ................ F16J 15/3412
                                                            277/408
5,722,665 A    3/1998 Sedy et al.
(Continued)

FOREIGN PATENT DOCUMENTS

CN    101644333 A    2/2010
EP    0870956 A1 *  10/1996
(Continued)

OTHER PUBLICATIONS

International Search Report issued in PCT/EP2021/051691, dated Apr. 8, 2021.
Australian Examination Report #2, dated Feb. 5, 2024.

*Primary Examiner* — Nathan Cumar
(74) *Attorney, Agent, or Firm* — Locke Lord LLP; Scott D. Wofsy (57) ABSTRACT

The invention relates to a mechanical seal comprising a rotating slide ring and a stationary slide ring defining a sealing gap therebetween, one of the slide rings having at least a first row of a plurality of first grooves with a foot region on a first radius and a head region on a second radius wherein a second circumferential sliding region is provided between the head regions of the radially outermost row of grooves of the slide ring and an outer radial edge of the slide ring, the other of the slide rings having at least a second row of a plurality of second grooves with a foot region at a third radius and a head region at a fourth radius wherein a second circumferential sliding region is provided between the head regions of the radially outermost row of grooves of the slide ring and an external radial edge of the slide ring, wherein the first radius is smaller than the third radius, and wherein the second radius is smaller than the fourth radius.

24 Claims, 6 Drawing Sheets

(58) Field of Classification Search
CPC ............. F16J 158/3404; F16J 158/3408; F16J 158/3412; F16J 158/3416; F16J 158/342; F16J 158/3424; F16J 158/3428
USPC ........................................................ 277/399
See application file for complete search history.

(56) References Cited

U.S. PATENT DOCUMENTS

| | | | | |
|---|---|---|---|---|
| 2002/0109302 A1* | 8/2002 | Muraki | ................ | F16J 15/3412 277/408 |
| 2005/0263963 A1* | 12/2005 | Lai | ....................... | F16J 15/3408 277/399 |

FOREIGN PATENT DOCUMENTS

| | | |
|---|---|---|
| EP | 0870956 A1 | 10/1998 |
| EP | 1054196 A2 | 11/2000 |
| JP | H08303606 A | 11/1996 |
| JP | 2019-015401 A | 1/2019 |

* cited by examiner

MECHANICAL SEAL WITH IMPROVED GROOVE ARRANGEMENT

CROSS-REFERENCE TO RELATED APPLICATIONS

This application is a U.S. National Phase Application filed under 35 U.S.C. § 371, based on International Patent Application No. PCT/EP2021/051691, filed Jan. 26, 2021, which claims priority to German Patent Application No. 10 2020 203 764.7, filed on Mar. 24, 2020, which are incorporated herein by reference.

The present invention relates to a mechanical seal, especially a mechanical seal for gaseous media, with improved groove arrangement of grooves in the sliding surfaces of the slide rings.

Mechanical seals with grooves in various embodiments are known from prior art. Especially with gas seals, which seal gaseous media, conveying grooves in a sliding surface of the rotating slide ring are known. These conveying grooves especially are to enable rapid lifting of the sliding surfaces of the mechanical seal from one another during startup of a machine to be sealed. This ensures that shortly after the start of rotation, a pressure increase is generated in the sealing gap between the rotating slide ring and the stationary slide ring, which provides for rapid lifting of the sliding surfaces from one another for contactless running of the mechanical seal. This minimizes possible leakage during start-up of the machine to be sealed.

It would therefore be desirable to be able to lift off the slide rings even at very low speeds.

It is therefore the object of the present invention to provide a mechanical seal with a rotating slide ring and a stationary slide ring which allows rapid lifting of the sliding surfaces of the slide rings from a standstill state, with a simple design and simple, inexpensive manufacturability.

This object will be solved by a mechanical seal having the features of claim 1 or 3. The subclaims show preferred further embodiments of the invention.

The mechanical seal according to the invention having the features of claim 1 or 3 enables rapid lifting of sliding surfaces of the rotating and stationary slide ring from each other from a stationary position. Furthermore, the mechanical seal has an improved sealing effect, even against high pressures, and especially very rapid pressure build-up at the start of rotation in the sealing gap between the rotating and stationary slide ring. Thus, even at the start of rotation of the mechanical seal, practically no leakage occurs across the sealing gap, as very rapid pressure build-up will be realized This will be achieved according to claim 1 by the mechanical seal comprising a rotating and stationary slide ring, which define a sealing gap therebetween. Herein, one of the slide rings, especially the rotating slide ring, has a first row of a plurality of first grooves with a foot region on a first radius R1 and a head region on a second radius R2. The other slide ring, especially the stationary slide ring, has at least a second row of a plurality of second grooves having a foot region on a third radius R3 and a head region on a fourth radius R4. Thus, both the rotating slide ring and the stationary slide ring each have circumferentially arranged grooves. The head regions of the grooves are directed toward the medium to be sealed. In this case, a first circumferential slide region is present between the head regions of the radially outermost row of first grooves of one slide ring and an external radial edge of this slide ring. A second circumferential sliding region is present between the head regions of the radially outermost row of second grooves of the other slide ring and an external radial edge of this slide ring. Thus, the sliding surfaces of the two slide rings each have a circumferential sliding region adjacent to the external radial edge, in which no grooves or the like are provided. As a result, these two sliding regions adjacent to the external radial edges form a sealing dam which has a sealing effect especially in a standstill state of the mechanical seal. The radii of the foot regions and head regions are selected such that the first radius R1 of the foot regions of the first grooves is smaller than the third radius R3 of the foot regions of the second grooves. Furthermore, the second radius R2 of the head regions of the first grooves is smaller than the fourth radius R4 of the head regions of the second grooves. This ensures that, when rotating, gradual build-up of pressure in the sealing gap occurs in the direction of the medium to be sealed. The pressure buildup occurs in the direction of the medium to be sealed. As a result, pressure fields can be established quickly between the sliding surfaces during operation even at low speeds, which occur when the mechanical seal starts up from a standstill state, and which especially form a circumferentially closed pressure field. Since the circumferentially closed pressure field is established very quickly, only minimal leakage occurs even when the mechanical seal starts up from a standstill state, even if a pressure difference between the medium to be sealed and the atmospheric side is several $100 \times 10^5$ Pa.

Further preferably, the fourth radius R4, on which the head regions of the second grooves are arranged, is at most 20% larger than the second radius R2, on which the head regions of the first grooves are arranged. In this way, overlapping of the grooves of the slide rings can be achieved, resulting in a particularly rapid, step-like pressure build-up, which enables rapid sealing of the mechanical seal after a start of the mechanical seal. Particularly preferably, the fourth radius is max. 10% larger than the second radius.

According to claim 3, the advantages according to the invention are achieved by the mechanical seal comprising a rotating slide ring and a stationary slide ring defining a sealing gap therebetween. In this regard, one of the slide rings, especially the rotating slide ring, has a first row of a plurality of first grooves with a foot region on a first radius R11 and a head region on a second radius R12. The other slide ring, especially the stationary slide ring, has at least a second row of a plurality of second grooves having a foot region on a third radius R13 and a head region on a fourth radius R14. Thus, both the rotating slide ring and the stationary slide ring each have circumferentially arranged grooves. The head regions of the grooves are directed toward the medium to be sealed. There is a first circumferential slide region between the head regions of the radially innermost row of first grooves of one slide ring and an internal radial edge of this slide ring. A second circumferential slide region is located between the head regions of the radially innermost row of second grooves of the other slide ring and an internal radial edge of this slide ring. Thus, the sliding surfaces of the two slide rings each have a circumferential sliding region adjacent to the internal radial edge, in which no grooves or the like are provided. As a result, these two sliding regions adjacent to the internal radial edges form a sealing dam which has a sealing effect especially in a standstill state of the mechanical seal. The radii of the foot regions and head regions are selected such that the first radius R11 of the foot regions of the first grooves is larger than the third radius R13 of the foot regions of the second grooves. Furthermore, the second radius R12 of the head regions of the first grooves is larger than the fourth radius R14 of the head regions of the second grooves. This ensures that gradual build-up of pressure in the sealing gap in the direction of the medium to be sealed, which is located on the radially internal side, occurs when rotating. Pressure buildup also occurs in the direction of the medium to be sealed. As a result, pressure fields can rapidly be established between the sliding surfaces during operation even at low speeds, which occur when the mechanical seal starts up from a standstill state, forming especially a circumferentially closed pressure field. Since the circumferentially closed pressure field is very rapidly built up, only minimal leakage occurs even when the mechanical seal starts up from a standstill state, even if a pressure difference between the medium to be sealed and the atmospheric side is several $100 \times 10^5$ Pa.

Further preferably, the fourth radius R14, on which the head regions of the second grooves are arranged, is at most 20% smaller than the second radius R12, on which the head regions of the first grooves are arranged. This allows to achieve overlapping of the grooves of the slide rings, resulting in a particularly fast, step-like pressure build-up, which enables rapid sealing of the mechanical seal after a start of the mechanical seal. Particularly preferably, the fourth radius R14 is a maximum of 10% smaller than the second radius R12.

Additional support for rapid pressure build-up will be achieved if the first and/or second grooves preferably have a depth which changes from the foot region to the head region. Preferably, the depth decreases from the foot region to the head region. Particularly preferably, the depth decreases continuously in the direction towards the head region of the grooves. Alternatively, the depth gradually decreases from the foot region to the head region. Further preferably, tangential transition of the head region to the sliding surface of the slide ring is provided.

According to another preferred embodiment of the present invention, the grooves of the slide rings are crescent-shaped and having an arcuate course. Preferably, a peak of the crescent-shaped grooves is provided at the head region of the grooves, so that the grooves are preferably V-grooves having crescent shape.

Further preferably, the grooves of the rotating slide ring are arranged in opposite directions to the grooves of the stationary slide ring. This results in a crossed arrangement of the grooves of the rotating slide ring and the stationary slide ring. This allows the mechanical seal to reliably seal in both rotational directions even independently of a rotational direction.

According to another preferred embodiment of the invention, the grooves of the rotating slide ring and the stationary slide ring have an overlap region of at least 10% and preferably max. 40% of the groove regions. Further preferably, the overlap region is in a range of 20% to 30%.

According to another preferred embodiment of the invention, one of the slide rings has a third row of a plurality of third grooves. This allows an additional pressure build-up stage to be implemented in the sealing gap between the slide rings.

Further preferably, the other of the slide rings has a fourth row of a plurality of fourth grooves. As a result, each of the two slide rings has two rows of grooves at different radial positions, which allow gradual pressure build-up in the sealing gap, especially during a start-up phase of the mechanical seal.

Preferably, a geometric shape of the grooves of the slide rings is the same.

According to another preferred embodiment of the invention, the grooves of the rotating slide ring and the stationary slide ring have no overlapping surfaces. That is, the radii of the foot regions and the head regions are selected such that slide regions in the radial direction are located between the grooves on both slide rings. Even without overlapping of the groove rows in the sliding surfaces of the slide rings, pressure buildup can be realized because the resulting pressure fields at the radial head regions of the grooves extend beyond the radius of the head regions of the grooves. As a result, pressure buildup can be continued in the radially subsequent row of grooves.

According to another preferred embodiment of the present invention, the mechanical seal has circumferentially continuous third and fourth sliding regions on an internal radial edge of the slide rings forming a second sealing region on the internal circumference of the sealing gap. This further improves sealing of the mechanical seal in a standstill state.

Further preferably, the mechanical seal is a gas seal which seals a gaseous medium against preferably the atmosphere.

In the following, preferred embodiments of the invention are described in detail making reference to the accompanying drawing, wherein.

In the following, a mechanical seal 1 according to a first preferred embodiment of the invention is described in detail, while making reference to FIGS. 1 to 6.

Figure 1:
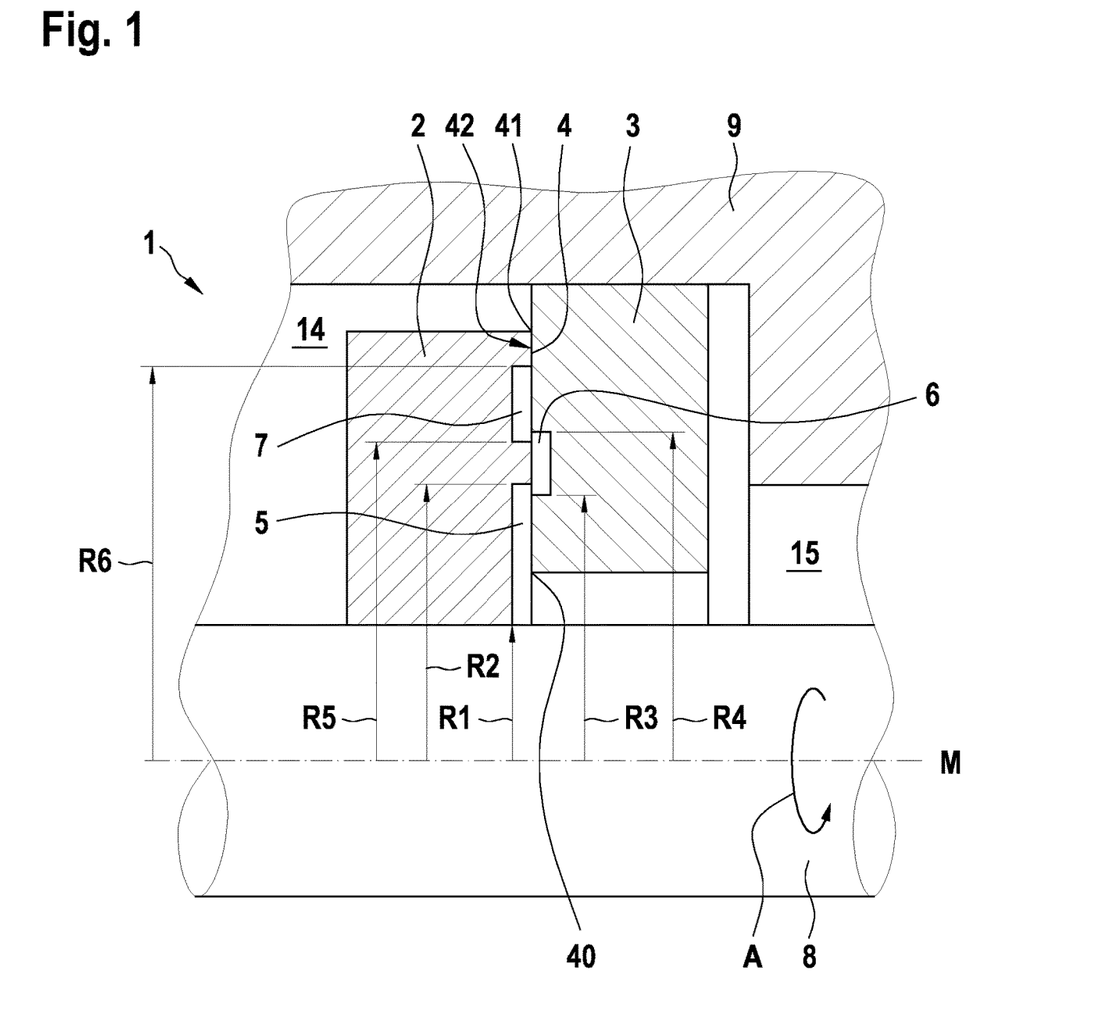
FIG. 1 is a schematic sectional view of a mechanical seal according to a first embodiment of the invention.

As may be seen from FIG. 1, the mechanical seal 1 comprises a rotating slide ring 2 and a stationary slide ring 3. A sealing gap 4 is defined between the rotating slide ring 2 and the stationary slide ring 2.

The mechanical seal 1 seals a product region 14, which is under high pressure, from an atmospheric region 15.

The mechanical seal 1 of this embodiment is a gas seal, as the medium to be sealed in the product region 14 is a gas.

The rotating slide ring 2 is rotatably connected to a rotating shaft 8. The reference number M indicates a center line of the shaft 8.

The stationary slide ring 3 is non-rotatably mounted on a housing 9.

Figure 2:
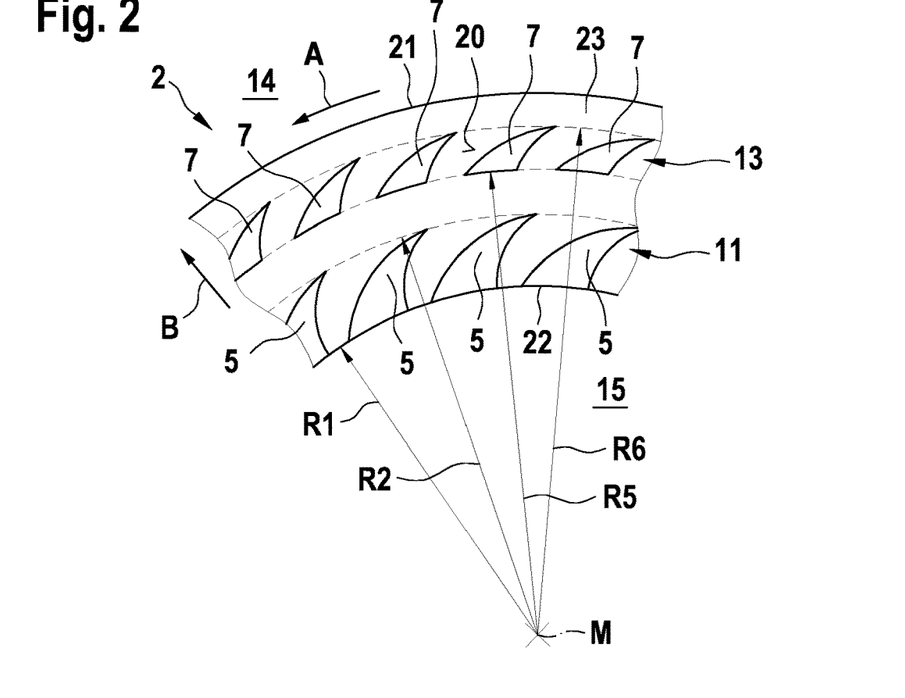
FIG. 2 is a schematic top view of a sliding surface of a rotating slide ring of FIG. 1.
Figure 3:
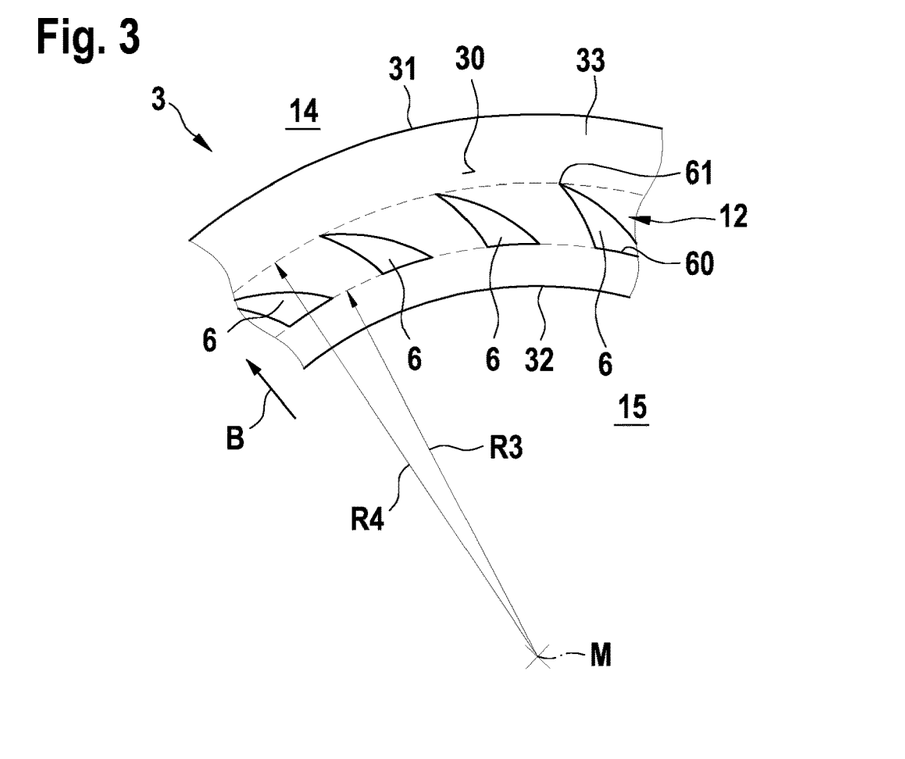
FIG. 3 is a schematic top view of a sliding surface of a stationary slide ring of FIG. 1.

FIGS. 2 to 5 show details of the rotating slide ring 2 and the stationary slide ring 3. FIG. 2 shows a top view of the rotating slide ring. As may be seen from FIG. 2, a plurality of grooves are provided on a sliding surface 20 of the rotating slide ring 2 facing the seal gap 4. The grooves are crescent-shaped as a V-groove and are arranged in two rows. Herein, a plurality of first grooves 5 form a first row 11 of the grooves. A plurality of third grooves 7 form a third row 13 of grooves. In FIG. 3, a top view of a sliding surface 30 of the stationary slide ring 3 is shown. A second row 12 of second grooves 6 is arranged in the sliding surface 30 of the stationary slide ring 3. The second grooves 6 are also formed in a crescent shape as a V-groove. Herein, an arc shape of the crescent-shaped second grooves 6 is opposite to an arc shape of the first and third grooves 5, 7 of the rotating slide ring 2.

The overlap region 10 is preferably about 10% to 20% of the respective groove regions.

Figure 4:
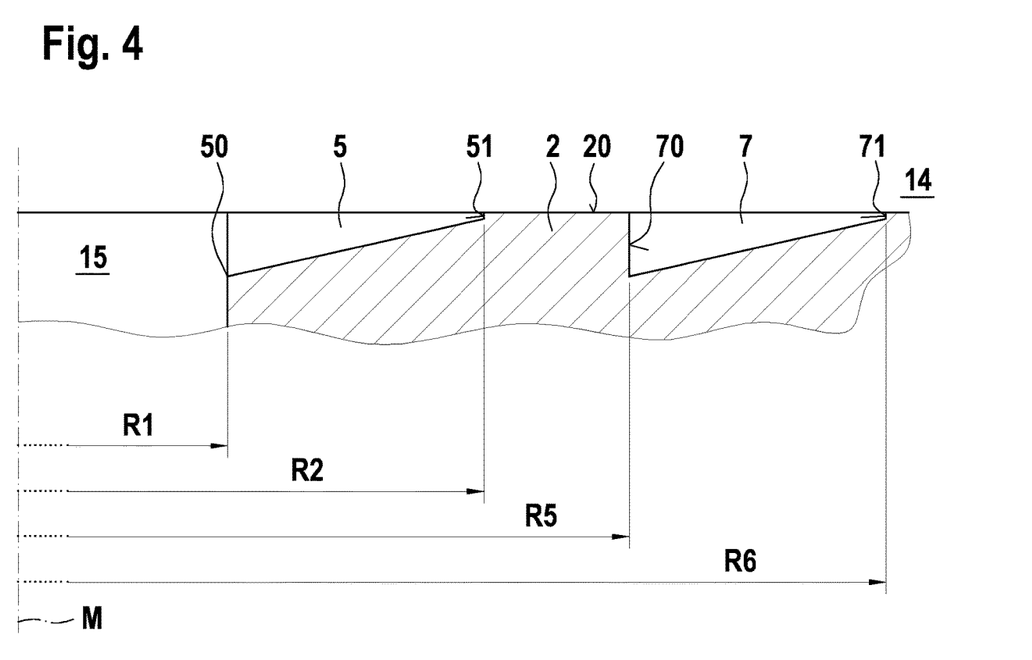
FIG. 4 is a schematic sectional view through grooves in the rotating slide ring of FIG. 1.

FIG. 4 shows a sectional view of the rotating slide ring 2 along a centerline of a first groove 5 and a third groove 7, the first groove 5 having a foot region 50 with a first radius R1 and a head region 51 with a second radius R2. As may be seen from FIG. 4, a depth of the first groove 5 changes from the foot region 50 to the head region 51 in a continuous manner, with the depth continuously decreasing of the first groove 5 in the direction towards the head region 51.

Similar to the first grooves 5, the third grooves 7 are also formed with a foot region 70 and a head region 71, with a depth of the grooves continuously decreasing from the foot region 70 toward the head region 71.

Figure 5:
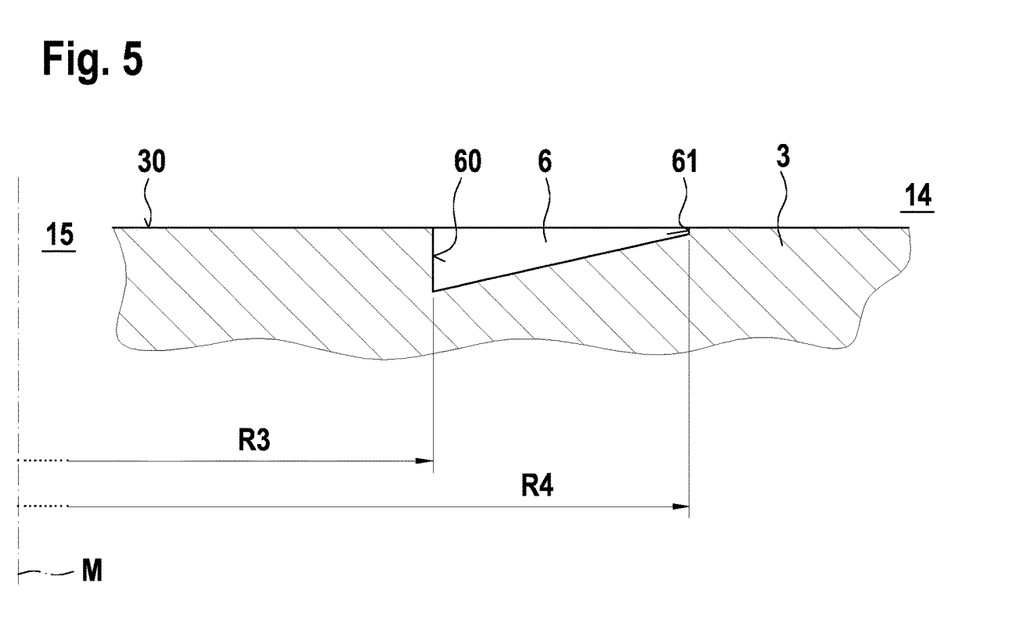
FIG. 5 is a schematic sectional view through a groove in the stationary slide ring of FIG. 1.

FIG. 5 shows a sectional view of a center line of a second groove 6. The second groove 6 also has a foot region 60 and a head region 61. A depth of the second groove 6 also continuously changes from the foot region 60 to the head region 61, with the depth continuously decreasing from the foot region 60 to the head region 61.

Figure 6:
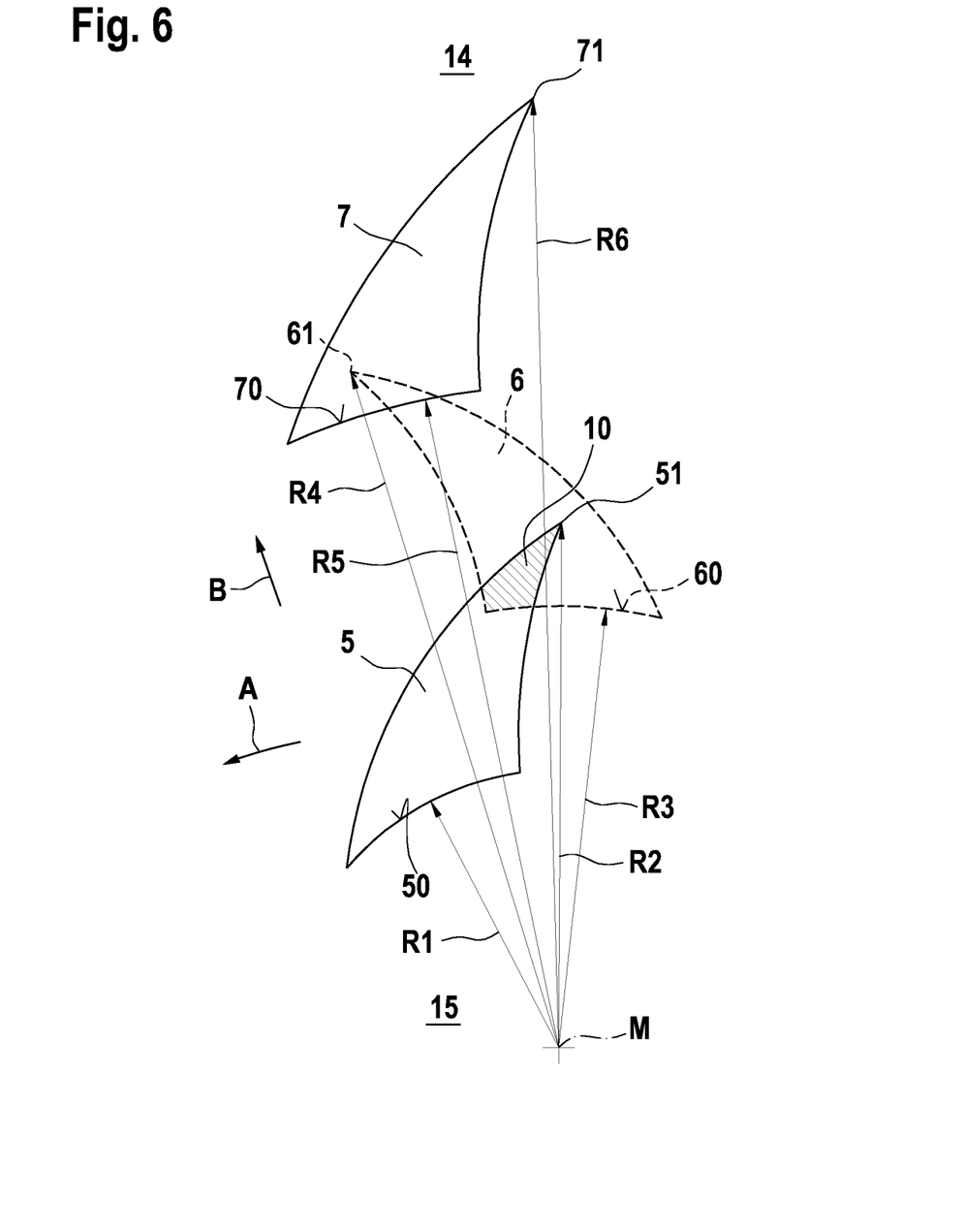
FIG. 6 is a schematic representation of an overlap region during relative rotation between the rotating slide ring and the stationary slide ring of FIG. 1.

It should be noted that in the example embodiments all grooves 5, 6, 7 of the three rows of grooves are similarly formed. Except that in the rotating slide ring 2, the curvature of the second grooves 6 in the stationary slide ring 3 is opposite to the curvature of the first and third grooves 5, 7. This results in an intersecting arrangement of the grooves when viewed from above in the direction of the center line M on the seal gap. This is schematically shown in FIG. 6. As a result, an overlap region 10 is formed each time when sweeping through the grooves upon rotating the rotating slide ring (arrow A). Sealing is possible regardless of a rotational direction.

As may be seen from the sectional view of FIG. 1, a step-like groove arrangement of the grooves 5, 6, 7 in the sliding surfaces 20, 30 of the rotating and stationary slide ring 2, 3 is created. As may be seen from FIGS. 2 and 3, the foot regions 50 of the first grooves 5 are arranged on the first radius R1, which is smaller than a third radius R3, where the foot regions 60 of the second grooves 6 are arranged. Furthermore, the head regions 51 of the first grooves 5 are arranged on the second radius R2, which is smaller than a fourth radius R4, where the head regions 61 of the second grooves 6 are arranged. Furthermore, the foot regions 70 of the third grooves 7 are arranged on a fifth radius R5, which is smaller than the fourth radius R4. The head regions 71 of the third grooves 7 are arranged on a sixth radius R6, which is larger than the fourth radius R4 on which the head regions 61 of the second grooves 6 are arranged.

This arrangement of the grooves 5, 6, 7 creates the step-like structure of the groove arrangement on the sliding surfaces. As a result, pressure fields may rapidly be generated at the respective head regions of the grooves during operation when rotation of the rotating slide ring 2 will be started from a standstill state, thus allowing increase of pressure from the internal radial side 40 of the seal gap 4, at the atmosphere region 15 towards the external radial side 41 of the seal gap 4 at the product region 14. The pressure build-up direction is indicated in the figures by the arrow B.

More precisely, at the start of rotation, a first pressure build-up occurs with correspondingly formed pressure fields in the region of the head regions 51 of the first grooves 5. The pressure fields are transferred to the foot region 60 of the second grooves 6, wherefrom rotation then generates further respective pressure fields in the region of the head regions 61 of the second grooves 6. The second pressure fields will subsequently be transferred in the same way to the foot regions 70 of the third grooves 7.

This results in very rapid pressure build-up at the start of rotation of the rotating slide ring 2, so that rapid lifting of the sliding surfaces 20, 30 from each other will be achieved and yet at most minimal leakage occurs, starting from the product region 14 via the sealing gap 4 to the atmosphere region 15. Consequently, increase of pressure in the sealing gap 4 from the internal radial side 40 to the external radial side 41 of the sealing gap occurs.

By generating a circumferentially continuous overpressure region in each case in the region of the head regions of the grooves 5, 6, 7, rapid pressure buildup in the sealing gap 4 is thus supported and possible leakage is reduced to a minimum when the rotating slide ring starts to come into operation.

Thus, a sealing effect against high pressures due to rotation can be achieved in a targeted manner by providing grooves in both sliding surfaces 20, 30, which are circumferentially formed in series on the equal surfaces. The staggered arrangement of the mutually overlapping grooves forms overlapping regions where pressure buildup is specifically enabled in stages, resulting in significantly reduced leakage when starting operation of the rotating slide ring. The groove arrangement enables compression ratios of 1:100 or more, based on the pressure in the atmospheric region 15, in the region of the sealing gap 4, which usually is far above a pressure difference between the product region 14 and the atmospheric region 15.

As may further be seen from FIGS. 2 and 3, the first row 11 of first grooves 5 and the third row 13 of third grooves 7 are arranged such that a first external sliding region 23 is formed at the external radial edge 21. On the stationary slide ring 3, a second external sliding region 33 is formed on the external radial edge 31. Thus, in a standstill state of the mechanical seal, the respective circumferential groove-free sliding regions 23, 33 form an external sealing dam between the first sliding region 23 and the second sliding region 33. Thus, the grooves are formed such that they do not extend to the external radial edge, so that an external sealing dam 42 is made possible by the circumferential sliding regions 23, 33, which additionally reduces possible leakage during startup. The external sealing dam 42 is shown schematically in FIG. 1.

Figure 7:
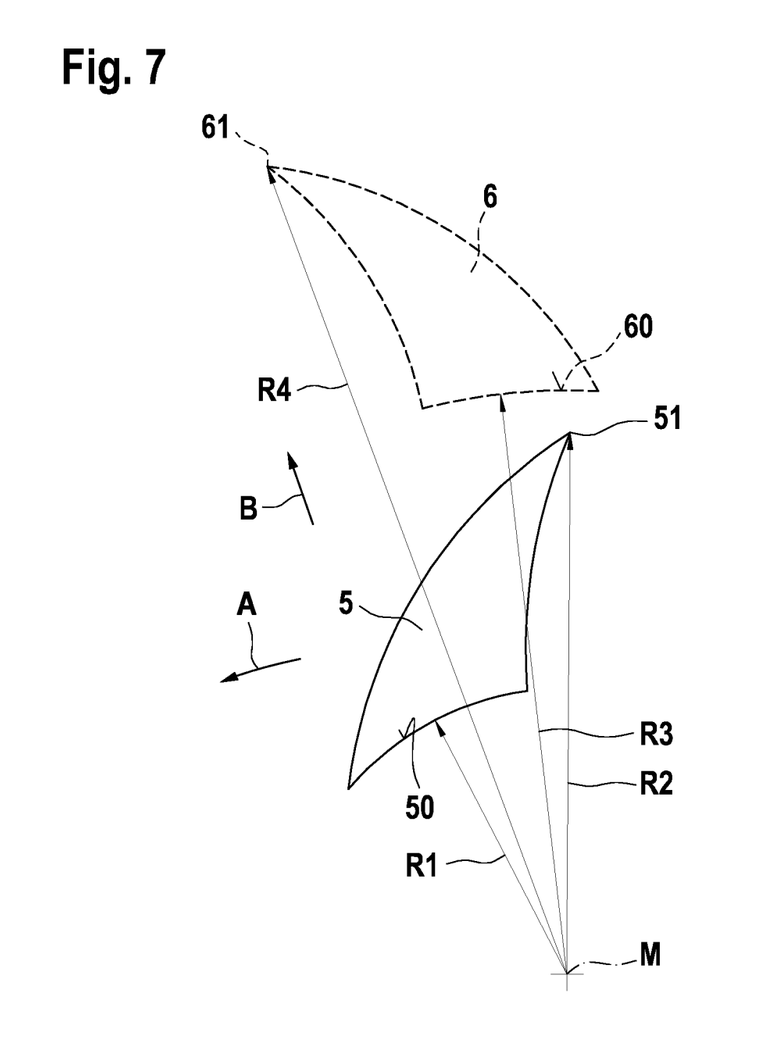
FIG. 7 is a schematic representation of an arrangement of grooves according to a second embodiment of the invention.

FIG. 7 schematically shows a mechanical seal according to a second embodiment of the invention. The mechanical seal of the second example embodiment essentially corresponds to the first embodiment example, although, contrary to the first embodiment example, no overlap region is present between the rows of first grooves 5 and second grooves 6. Thus, the second radius R2 at the head regions 51 of the first grooves 5 is always smaller than the third radius R3 at the foot regions 60 of the second grooves 6 Nevertheless, the idea of gradual pressure build-up according to the invention may be realized, since by pressure build-up in the first grooves 5 at the head regions 51 a pressure field will be created which projects radially outward beyond the head regions 51. Thus, the pressure field is located in the foot region 60 of the row of second grooves 6. This allows continuous further pressure build-up through the row of second grooves 6. It should be noted that preferably a radial distance between the head regions 51 and the foot regions 60 is selected such that the distance is at most 50% of a radial extent of the first groove 5. In other words, preferably the inequality $$R3-R2 \leq \tfrac{1}{2} \cdot (R2-R1)$$

is fulfilled. Otherwise, this example of embodiment corresponds to the previous example of embodiment, so that reference can be made to the description given therein.

Figure 8:
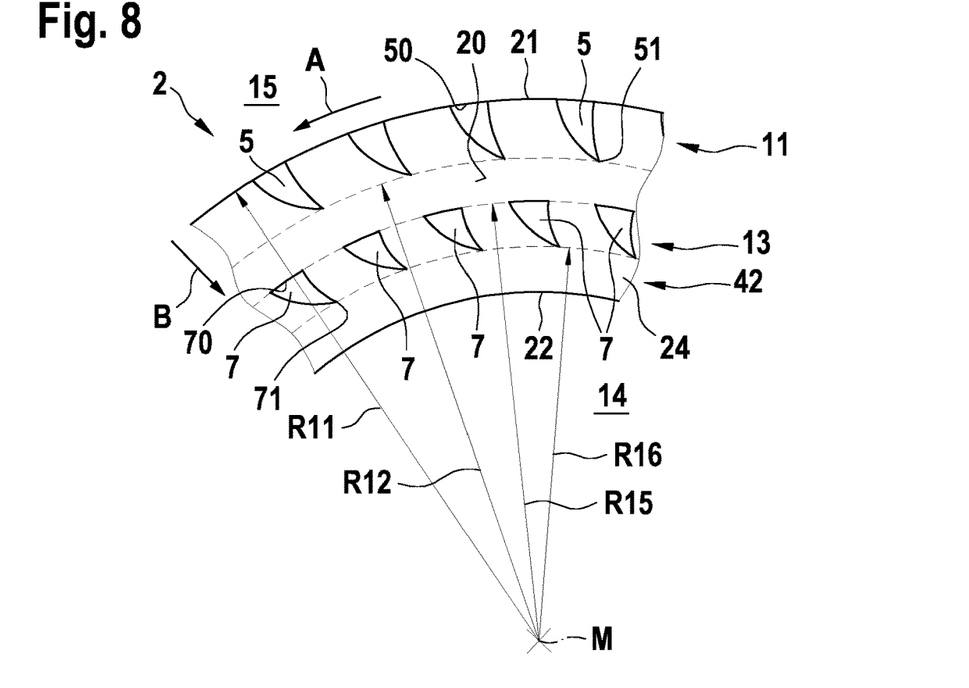
FIG. 8 is a schematic top view of a sliding surface of a rotating slide ring according to a third embodiment of the invention.
Figure 9:
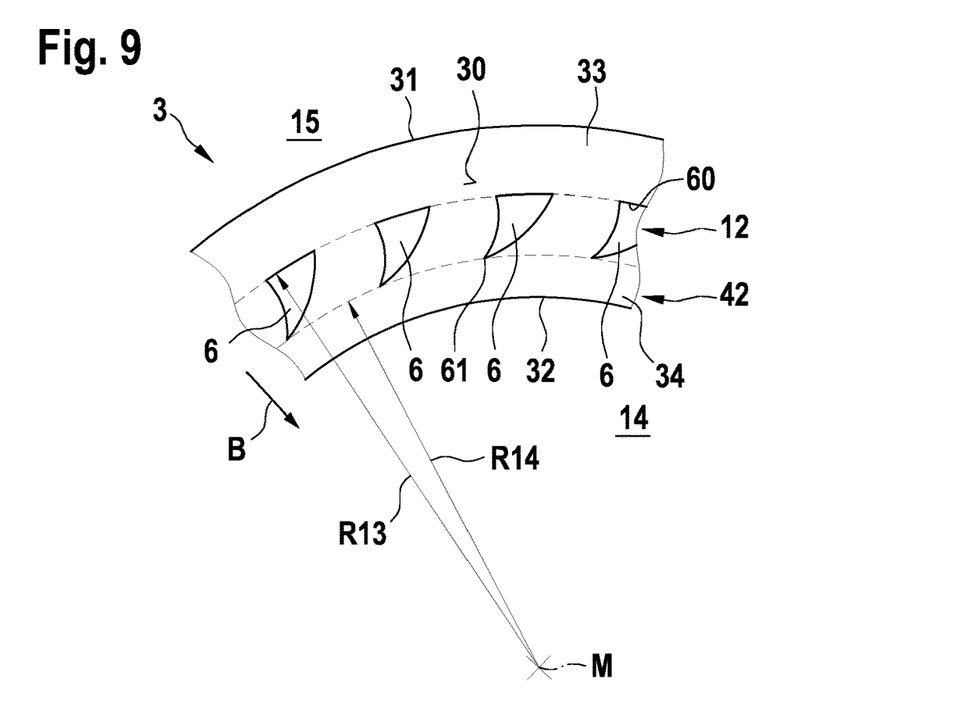
FIG. 9 is a schematic top view of a sliding surface of a stationary slide ring of the third embodiment.

FIGS. 8 and 9 show a mechanical seal according to a third embodiment of the invention. Equal or functionally equal portions are identified using the same reference numbers.

The third example embodiment corresponds essentially to the first embodiment example, although in contrast to the first example embodiment a pressure build-up direction B is reversed. As may be seen from FIGS. 8 and 9, in the third example embodiment the product region 14 is provided radially inside the sliding surfaces of the slide rings 2, 3 and the atmosphere region 15 is arranged radially outside the slide rings 2, 3. This results in pressure build-up direction B which extends in the radial direction from the outside to the inside.

As may be seen from FIG. 8, a first row 11 of first grooves and a third row 13 of third grooves are arranged in the rotating slide ring 2. In the stationary slide ring 3, as shown in FIG. 9, a second row 12 of second grooves is formed. The grooves of the three rows 11, 12, 13 are thereby provided as crescent-shaped V-grooves. Due to the reversed pressure build-up direction B compared to the first example embodiment, the foot regions and head regions of the grooves are also reversed in the radial direction, respectively. As may be seen from FIG. 8, the foot regions 50 of the first grooves 5 extend to the external radial edge 21 of the rotating slide ring. However, the third grooves 7 of the rotating slide ring 2 do not extend to the internal radial edge 22 of the rotating slide ring. Similarly, the head regions 61 of the second grooves 6 do not extend to the internal radial edge 32 of the stationary slide ring. This results in an internal sliding surface 24 on the rotating slide ring and an internal sliding surface 34 on the stationary slide ring 3. Thus, a sealing dam is provided on the radial internal side of the sliding surfaces by the two internal sliding surfaces 24, 34, which provides additional sealing function with respect to the product region 14, especially in the stationary state of the mechanical seal.

As in the first example embodiment, there are no overlap regions between the first grooves 5 and the second grooves 6, nor between the second grooves 6 and the third grooves 7. As may be seen from FIG. 8, foot regions 50 of the first grooves 5 are arranged on a first radius R11 and the head regions 51 are arranged on a second radius R12. The foot regions 70 of the third grooves 7 are arranged on a fifth radius R15 and the head regions 71 are arranged on a sixth radius R16. As may be seen from FIG. 9, the foot regions 60 of the second grooves 6 are arranged at a third radius R13 and the head regions 61 are arranged at a fourth radius R14. Since there are overlap regions between the first grooves 5 and the second grooves 6, a third radius R13 is thus larger than a second radius R12. Furthermore, for the overlap regions between the second grooves 6 and the third grooves 7, the fourth radius R14 of the head regions 61 is smaller than the fifth radius R15 of the foot regions 70 of the third grooves 7.

As may be seen from FIG. 8, the foot regions 50 of the first grooves 5 extend to the external radial edge 21 of the rotating slide ring. In contrast, the head regions 71 of the third grooves 7 do not extend to the internal radial edge 22 of the rotating slide ring. As may be seen from FIG. 9, the foot regions 60 of the second grooves 6 do not extend as far as the external radial edge 31 of the stationary slide ring. Also, the head regions 61 of the second grooves 6 do not extend to the internal radial edge 32 of the stationary slide ring. As a result, a radially internal sealing dam 42 is realized.

With regard to the described embodiments, it should be noted that it is of course also possible for the stepped arrangement of the rows of a plurality of grooves to be provided in reverse on the sliding surfaces of the slide rings. That is, the first and third rows 11, 13 of grooves can also be provided on the stationary slide ring 3 and the second row 12 of grooves can then be arranged accordingly on the rotating slide ring 2. Also, the number of rows of grooves in the sliding surfaces may vary. Importantly, according to the invention, the rows of grooves located on the two sliding surfaces are alternately arranged in the radial direction from the inside to the outside, each at different mean groove diameters, to achieve the gradual build-up of pressure in the sealing gap from the inside to the outside.

During rotation, the grooves can partially overlap or alternatively there can be no overlapping. Mixed arrangements are also possible in a mechanical seal, i.e. two rows of grooves partially overlap and two rows of grooves do not overlap.

LIST OF REFERENCE NUMBERS

1 Mechanical seal
2 Rotating slide ring
3 Stationary slide ring
4 Sealing gap
5 First grooves
6 Second grooves
7 Third grooves
8 Shaft
9 Housing
10 Overlap region
11 First row of first grooves
12 Second row of second grooves
13 Third row of third grooves
14 Product region
15 Atmosphere region
20 Sliding surface of rotating slide ring
21 External radial edge of the rotating slide ring
22 Internal radial edge of rotating slide ring
23 First sliding region of the sliding surface
24 Internal sliding region of stationary slide ring
30 Sliding surface of the stationary slide ring
31 External radial edge of the stationary slide ring
32 Internal radial edge of the stationary slide ring
33 Second sliding region of the stationary slide ring
34 Internal sliding region of the stationary slide ring
40 Internal radial side of the seal gap
41 External radial side of the sealing gap
42 Sealing dam
50 Foot region
51 Head region
60 Foot region
61 Head region
70 Foot region
71 Head region
A Rotational direction
B Pressure buildup direction
M Center line
R1 First radius of foot regions 50
R2 Second radius of head regions 51
R3 Third radius of foot regions 60

R4 Fourth radius of head regions 61
R5 Fifth radius of foot regions 70
R6 Sixth radius of the head regions 71
R11 First radius of foot regions 50
R12 Second radius of head regions 51
R13 Third radius of foot regions 60
R14 Fourth radius of head regions 61
R15 Fifth radius of foot regions 70
R16 Sixth radius of the head regions 71

The invention claimed is:

1. A mechanical seal comprising:
a rotating slide ring and a stationary slide ring defining a sealing gap therebetween,
wherein one of the slide rings includes at least a first row of a plurality of first grooves each having a foot region on a first radius and a head region on a second radius, a first circumferential sliding region being provided between head regions of a radially outermost row of grooves of the slide ring and an external radial edge of the slide ring,
the other of the slide rings having at least a second row of a plurality of second grooves each with a foot region on a third radius and a head region on a fourth radius, a second circumferential sliding region being present between head regions of a radially outermost row of grooves of the slide ring and an outer radial edge of the slide ring,
wherein the first radius is smaller than the third radius,
wherein the second radius is smaller than the fourth radius, and
wherein the plurality of first grooves and the plurality of second grooves have a respective depth which changes from the foot regions thereof to the head regions thereof.

2. The mechanical seal according to claim 1, wherein the fourth radius is at most 20% larger than the second radius.

3. The mechanical seal according to claim 1, wherein the depth of the grooves decreases starting from the foot region towards the head region.

4. The mechanical seal according to claim 1, wherein the grooves are formed in a crescent shape having an arcuate course.

5. The mechanical seal according to claim 4, wherein the grooves are sickle-shaped V-grooves having a tip at the head region.

6. The mechanical seal according to claim 4, wherein the grooves of the rotating slide ring are arranged in the opposite direction to the grooves of the stationary slide ring.

7. The mechanical seal according to claim 1, wherein the grooves of the rotating slide ring and the stationary slide ring have an overlapping area of at least 10% of the groove regions.

8. The mechanical seal according to claim 1, wherein the grooves of the rotating slide ring and the stationary slide ring have no overlap region.

9. The mechanical seal according to claim 1, wherein one of the slide rings has a third row of a plurality of third grooves.

10. The mechanical seal according to claim 9, wherein the other one of the slide rings has a fourth row of a plurality of fourth grooves.

11. The mechanical seal according to claim 1, wherein a geometrical shape is the same for all grooves located on a slide ring.

12. The mechanical seal according to claim 1, wherein the mechanical seal is a gas seal for sealing gaseous media.

13. A mechanical seal comprising:
a rotating slide ring and a stationary slide ring defining a sealing gap therebetween,
one of the slide rings having at least a first row of a plurality of first grooves each having a foot region on a first radius and a head region on a second radius, a first circumferential slide region being present between head regions of a radially innermost row of grooves of said slide ring and an internal radial edge of the slide ring,
the other of the slide rings having at least a second row of a plurality of second grooves each with a foot region on a third radius and a head region on a fourth radius, a second circumferential slide region being present between head regions of a radially innermost row of grooves of the slide ring and an internal radial edge of the slide ring,
wherein the first radius is larger than the third radius,
wherein the second radius is larger than the fourth radius, and
wherein the plurality of first grooves and the plurality of second grooves have a respective depth which changes from the foot regions thereof to the head regions thereof.

14. The mechanical seal according to claim 13, wherein the fourth radius is smaller than the second radius by a maximum of 20%.

15. The mechanical seal according to claim 13, wherein the depth of the grooves decreases starting from the foot region towards the head region.

16. The mechanical seal according to claim 13, wherein the grooves are formed in a crescent shape having an arcuate course.

17. The mechanical seal according to claim 16, wherein the grooves are sickle-shaped V-grooves having a tip at the head region.

18. The mechanical seal according to claim 16, wherein the grooves of the rotating slide ring are arranged in the opposite direction to the grooves of the stationary slide ring.

19. The mechanical seal according to claim 13, wherein the grooves of the rotating slide ring and the stationary slide ring have an overlapping area of at least 10% of the groove regions.

20. The mechanical seal according to claim 13, wherein the grooves of the rotating slide ring and the stationary slide ring have no overlap region.

21. The mechanical seal according to claim 13, wherein one of the slide rings has a third row of a plurality of third grooves.

22. The mechanical seal according to claim 21, wherein the other one of the slide rings has a fourth row of a plurality of fourth grooves.

23. The mechanical seal according to claim 13, wherein a geometrical shape is the same for all grooves located on a slide ring.

24. The mechanical seal according to claim 13, wherein the mechanical seal is a gas seal for sealing gaseous media.

* * * * *